US008284745B2

(12) United States Patent  (10) Patent No.: US 8,284,745 B2
Noldus  (45) Date of Patent: Oct. 9, 2012

(54) USING WLAN FOR MEDIA TRANSPORT IN CELLULAR MOBILE NETWORKS

(75) Inventor: Rogier August Caspar Joseph Noldus, Goirle (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 399 days.

(21) Appl. No.: 12/675,898

(22) PCT Filed: Aug. 29, 2007

(86) PCT No.: PCT/NL2007/050425
§ 371 (c)(1),
(2), (4) Date: Mar. 1, 2010

(87) PCT Pub. No.: WO2009/028928
PCT Pub. Date: Mar. 5, 2009

(65) Prior Publication Data
US 2010/0232406 A1   Sep. 16, 2010

(51) Int. Cl.
*H04W 4/00* (2009.01)
(52) U.S. Cl. ........ 370/338; 370/313; 370/345; 455/406

(58) Field of Classification Search .................. 370/313, 370/314, 328, 329, 338, 345; 455/406, 428, 455/445
See application file for complete search history.

(56) References Cited

U.S. PATENT DOCUMENTS

| 5,832,382 | A  | * | 11/1998 | Alperovich ............ 455/433 |
| 6,628,952 | B1 | * | 9/2003 | Hankins et al. ............ 455/446 |
| 6,633,755 | B1 | * | 10/2003 | Haumont ................ 455/406 |
| 6,741,849 | B1 | * | 5/2004 | Verkama et al. ............ 455/406 |
| 2006/0276226 | A1 | * | 12/2006 | Jiang .................. 455/558 |
| 2007/0197209 | A1 |   | 8/2007 | Masanori |
| 2008/0117884 | A1 |   | 5/2008 | Hidenori |

* cited by examiner

*Primary Examiner* — Andrew Lai
(74) *Attorney, Agent, or Firm* — Roger S. Burleigh (57) ABSTRACT

The invention relates to a method of operating a telecommunication network for setting up a call between a first and a second WLAN-enabled mobile terminal. The telecommunication network comprising a first switching node, a second switching node, a gateway switching node, a first WLAN AP serving said first WLAN-enabled mobile terminal and a second WLAN AP serving said second WLAN-enabled mobile terminal. The first and second WLAN AP insert LMT indications into for example DTAP Setup messages, indicating that media transfer may take place directly from the WLAN APs.

9 Claims, 5 Drawing Sheets

Fig 3 State of the art

USING WLAN FOR MEDIA TRANSPORT IN CELLULAR MOBILE NETWORKS

TECHNICAL FIELD

The present invention relates to a method of operating a telecommunication network for setting up a call between a first and a second WLAN-enabled mobile terminal.

BACKGROUND

There is currently a trend in telecommunication to use Wireless Local Area Network (WLAN) for mobile telephony and for mobile data services. WLAN may be applied in a variety of ways, for telephony and data services, including, but not limited to:

IP Multimedia Subsystem (IMS) access through WLAN: an IMS subscriber may obtain IP connectivity through WLAN, for the purpose of accessing the IMS network; accessing the IMS network is used to request IMS services. The user may thus establish speech calls or other IMS services;

Unlicensed Mobile Access (UMA)/Generic Access Network (GAN): this method entails that a GSM subscriber uses WLAN as access method to a GSM core network, instead of using the GSM Radio Access Network (RAN) for accessing the GSM core network.

In both of the above cases, the WLAN access would typically be augmented by generic IP transport mechanism like Digital Subscriber Line (DSL) or Cable modem. The above-described methods of applying WLAN have in common that for both signalling and media transfer to and from the mobile terminal, WLAN is used as transport medium. The signalling is carried over the 'Control Plane'; the media is carried over the 'User Plane'.

When UMA is applied, the signalling and the media transfer for a UMA-capable GSM terminal is routed through the GSM core network. This entails, amongst others, that the signalling (Control plane) runs between the terminal and an MSC Server and that the media (User plane) runs between the terminal and a Media Gateway (MGW). So the media will, when using UMA, always run through the MGW in the GSM core network of a corresponding GSM operator. However, it is not desirable that the media is transferred through the GSM core network in e.g. the following cases:

using UMA on enterprise premises; employees have mobile phone with UMA access; when these employees establish calls between one another, there is not always a need for the media to run through the GSM core network;

using UMA for city-wide coverage of WLAN; users of a public WLAN network may establish calls with people in close vicinity; the media does not necessarily need to travel through the MGW in this case.

SUMMARY OF THE INVENTION

A goal of the present invention is to avoid media running through a MGW of a mobile telecommunication system when handling communication between UMA-capable mobile terminals.

This goal is achieved by providing a method of operating a telecommunication network for setting up a call between a first and a second WLAN-enabled mobile terminal, the telecommunication network comprising a first switching node, a second switching node, a gateway switching node a first WLAN AP serving the first WLAN-enabled mobile terminal and a second WLAN AP serving the second WLAN-enabled mobile terminal, wherein:

the first WLAN AP inserts a local media transfer (LMT) indication into a DTAP Setup message, indicating that media transfer may take place directly from the first WLAN AP;

the first switching node receives the first DTAP Setup message from the first WLAN AP;

the first switching node includes the LMT indication into a call establishment message, and sends the call establishment message to the gateway switching node;

the gateway switching node receives the call establishment message from the first switching node and sends the call establishment message to the second switching node;

the second switching node receives the call establishment message from the gateway switching node;

the second switching node includes the LMT indication into a second DTAP Setup message, and sends the second DTAP Setup message to the second WLAN AP;

the second WLAN AP receives the second DTAP Setup message, wherein the second WLAN AP inserts an acknowledge LMT indication in a first call confirm message if the second WLAN AP agrees to use local media transfer;

the second WLAN AP sends the first call confirm message to the second switching node;

the second switching node receives the first call confirm message from the second WLAN AP;

the second switching node includes the acknowledge LMT indication into an info message, and sends the info message to the gateway switching node;

the gateway switching node receives the info message from the second switching node and sends the info message to the first switching node;

the first switching node receives the info message from the gateway switching node;

the first switching node inserts the acknowledge LMT indication into a second call confirm message, and sends the second call confirm message to the first WLAN AP;

the first WLAN AP uses information included in the acknowledge LMT indication received from the second WLAN AP, for media transport to and from the second WLAN AP;

the second WLAN AP uses information included in the LMT indication received from first WLAN AP, for media transport to and from the first WLAN AP.

In an embodiment, the LMT indication comprising at least one of:

a boolean value indicating that local media transfer is offered by the first WLAN AP for this call;

an IP address associated with the first WLAN AP;

a port number associated with the first WLAN AP.

The acknowledge LMT indication may comprise at least one of:

a boolean value indicating that local media transfer is accepted by the second WLAN AP for this call;

an IP address associated with the second WLAN AP;

a port number associated with the second WLAN AP.

According to an embodiment, the first switching node includes the LMT indication into the call establishment message only if the gateway switching node belongs to the same PLMN as the first switching node.

According to an embodiment, the second switching node includes the LMT indication into the second DTAP Setup message only if the gateway switching node belongs to the same PLMN as the second switching node.

The telecommunication network may further comprise a service control entity, wherein:
an invoking node invokes an IN service running on the service control entity by sending a trigger message comprising the LMT indication;
the IN service indicating to the invoking node whether media related to the call may be transferred directly between the first WLAN AP and the second WLAN AP;
the IN service receiving from the invoking node an indication whether local media transfer will take place between the first WLAN AP and the second WLAN AP.

The invoking node may be the first switching node, the second switching node or the gateway switching node.

The call establishment message mentioned above may be sent using the BICC protocol or the SIP protocol.

The telecommunication network may for example be a GSM or a UMTS network.

According to an aspect of the inventions, there is also provided a method of operating a service control entity in communication with a telecommunications network for setting up a call between a first and a second WLAN enabled mobile terminal, the method comprising:
receiving an IN trigger message from a switching node, the trigger message comprising the LMT indication;
indicating to the switching node whether media related to the call may be transferred directly between the first WLAN AP and the second WLAN AP;
receiving from the switching node an indication whether local media transfer will take place between the first WLAN AP and the second WLAN AP.

The invention also relates to a switching node, such as a Mobile Services Switching Centre, for use in a telecommunications network for setting up a call between a first and a second WLAN enabled mobile terminal, the first WLAN enabled mobile terminal being served by a first WLAN AP, the switching node being arranged to:
receive a first DTAP Setup message from the first WLAN AP, the first DTAP Setup message comprising an LMT indication;
include the LMT indication into a call establishment message, and
send the call establishment message to a gateway switching node.

The invention also relates to a service control entity for an intelligent network, such as a Service Control Point, which provides intelligent network services to users of a telecommunications network, the service control entity being connectable to a switching node, and comprising a processing unit, an input unit connected to the processing unit and an output unit connected to the processing unit, wherein the processing unit is arranged to:
receive an IN trigger message from a switching node, the trigger message comprising the LMT indication;
indicate to the switching node whether media related to the call may be transferred directly between the first WLAN AP and the second WLAN AP;
receive from the switching node an indicating whether local media transfer will take place between the first WLAN AP and the second WLAN AP.

Please note that the term "node" embraces both a physical network node as well as a functional node (functional entity) that runs on e.g. a server together with other functional nodes.

BRIEF DESCRIPTION OF THE DRAWINGS

The present invention will be discussed in more detail below, using a number of exemplary embodiments, with reference to the attached drawings, in which.

DETAILED DESCRIPTION OF THE INVENTION

Figure 1:
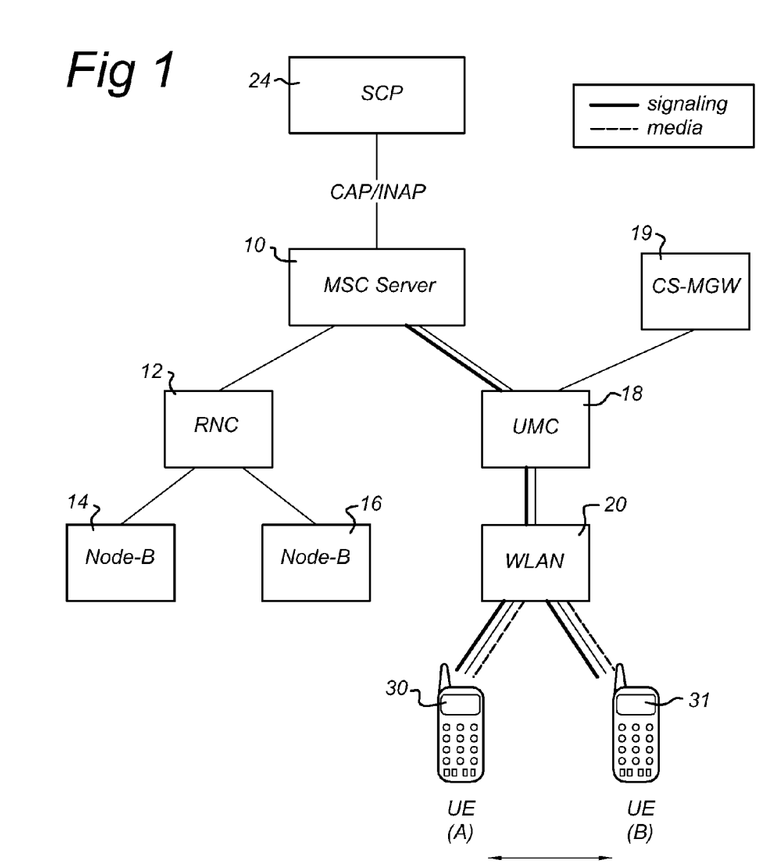
FIG. 1 schematically shows part of a telecommunication network according to an embodiment of the invention.

The present invention may be applied in communication networks, e.g. a mobile telecommunication network. The relevant parts of such a telecommunication network for the present invention are shown schematically in FIG. 1. FIG. 1 depicts a GSM/UMTS network with Unlicensed Mobile Access (UMA). The GSM/UMTS network in the example of FIG. 1 network comprises an MSC server 10, a Radio Network Controller (RNC) 12 and Nodes-B 14, 16. In this example, the GSM/UMTS network further comprises an Unlicensed Mobile access Controller (UMC) 18 and a WLAN Access Point (WLAN AP) 20. A Service Control Point (SCP) 24 is present which is in communication with the MSC server 10 via CAMEL Application Part (CAP) or Intelligent Networks (IN) Application Part (INAP). In the example of FIG. 1, two Mobile Stations (MS) 30, 31 which are equipped with WLAN access capability and UMA capability, use WLAN for access to the MSC Server 10. The two Mobile Stations 30, 31 are used by user A and user B respectively.

FIG. 1 depicts an example whereby a Circuit Switched (CS) call is established between terminal 30 and terminal 31. Terminal 30 and terminal 31 are both UMA-capable terminals that are served by the same MSC Server 10 and that access this MSC Server 10 through the same WLAN AP 20. Regular DTAP signalling runs between the terminal 30 and the MSC Server 10 and between the terminal 31 and the MSC Server 10. It should be noted that the MSC Server 10 in this example actually has threefold functionality:
Visited MSC for terminal 30, i.e. the MSC Server 10 acts as mobile originating (MO) MSC 10 for terminal 30. This functionality is also referred to as VMSC-A,
Gateway MSC for terminal 31, for handling the terminating call to terminal 31. This functionality is also referred to as GMSC-B,
Visited MSC for terminal 31, i.e. the MSC Server 10 acts as mobile terminating (MT) MSC for terminal 31. This functionality is also referred to as VMSC-B.

State of the Art UMA methodology would imply that the media for this call is routed through WLAN to the WLAN AP 20 and from there to the UMC 18. The UMC 18 would then relay the media to a CS-MGW 19, see FIG. 1. There would, for this case, be a media stream from the terminal 30 to the CS-MGW 19 and from the CS-MGW 19 to the terminal 31. This media transfer to the CS-MGW 19 is often undesirable and not necessary.

According to an embodiment of the invention, the SCP 24 is arranged to determine whether a user A and a user B belong to the same VPN group or to the same enterprise and whether the terminal 30 and the terminal 31 are connected to the MSC Server 10 through the same WLAN AP 20. If for example the terminal 30 and the terminal 31 are connected through the same WLAN AP 20, the SCP 24 instructs the MSC Server 10 to drop the media path back to the WLAN AP 20. Consequently, the media is no longer relayed through the CS-MGW 19, but is routed locally through the WLAN AP 20. This method saves unnecessary media transfer between the WLAN AP 20, the UMC 18 and the CS-MGW 19. Since terminal 30 and terminal 31 are served by the same WLAN AP there is no need to route the media further than the WLAN AP 20. Meanwhile, call related signalling, i.e. DTAP signalling, is still routed through the MSC Server 10 as normal. As a result, the MSC Server 10 retains full control over the call.

Figure 2:
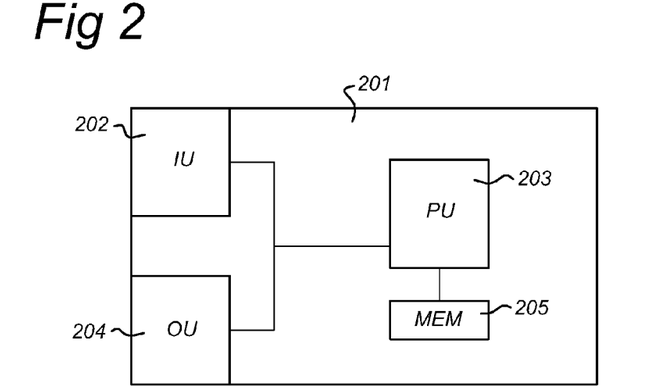
FIG. 2 shows a simplified form of a structure of an MSC or SCP.

The MSC Server(s) 10 and the SCP 24 may be implemented as network units 201, the structure of which is shown in simplified form in FIG. 2. The network unit 201 comprises a processing unit 203 connected to an input unit 202. Furthermore, the processing unit 203 is connected to an output unit 204. These allow the processing unit 203 to communicate with other network units or other elements in the communication network. The processing unit 203 may comprise a general purpose central processing unit (CPU) or a group of interconnected CPU's, or alternatively a dedicated processing unit, e.g. a signal processing unit. A memory module 205 may also be provided and may be used to store data, but may also be used to store a software program comprising instructions, which allows to use the processing unit 203 for various processing functions. E.g. it is possible that one network unit 201 under the control of a software program fulfils the function of the MSC Server 10 and at the same time the function of a Service Switching Function (SSF).

When the call is established, the IN service that is controlling the call from user A (also referred to as A-party), needs to determine the location of user B (also referred to as B-party). This information is needed so that the SCP 24 can determine whether it can instruct the MSC Server 10 to drop the media transfer of the call back to the WLAN AP 20. This detecting of B-party's location may be done in several ways.

According to an embodiment, Active Location Retrieval is used. Before the B-party is alerted by the VMSC-B, a paging signal is sent from the VMSC-B to the B-party. The sending of this paging signal has the effect that the current location of the B-party (i.e. terminal 31) is reported to the VMSC-B and is made available to the SCP 24.

According to another embodiment, the VMSC-B includes B-party's location information in a backwards ISDN User Part (ISUP) signalling to the VMSC-A, e.g. in an ISUP Address Complete Message (ACM) or in an ISUP Answer Message (ANM). When the VMSC-A receives the ISUP ACM or the ISUP ANM, it knows B-party's location. This location is then reported to the SCP 24 of the A-party (in the Alerting notification, for ISUP ACM, or in the Answer notification, for ISUP ANM).

When MSC Server 10 receives the instruction from the SCP 24 to drop the media transfer back to the WLAN AP 20, the MSC Server 10 will inform the CS-MGW 19 that the media transfer between the MS of the A-party (i.e. terminal 30) and the MS of the B-party (i.e. terminal 31) need not to be run through the MGW. As a consequence, the MGW 19 does not need to allocate media transfer resources for said media transfer. In addition, the MSC Server 10 has to inform the WLAN AP serving the terminal 30 (i.e. WLAN AP 20) and the WLAN AP serving the terminal 31 (in this case the same WLAN AP 20) that media transfer shall be run directly between these WLAN APs. When the WLAN AP 20 has validated this instruction from the MSC Server 10, it will act as IP proxy for the media stream between the A-party and the B-party. It is noted that any other signalling related to the call still follows the normal route to the MSC Server 10 and to the SCP 24, if applicable. Hence, the MSC Server 10 and the SCP 24, if applicable, remain in full control of the call.

Figure 3:
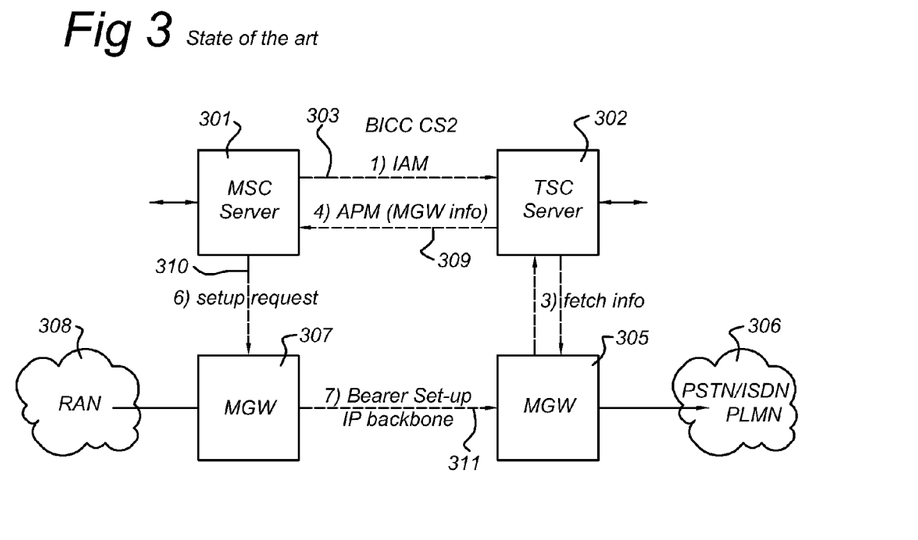
FIG. 3 schematically shows part of a mobile telecommunications network in according to the state of the art.

According to an embodiment, Bearer Independent Call Control (BICC) is used to control the fallback to WLAN for media transfer. BICC is a call control signalling standard that is used in circuit switched networks, such as GSM, to control the establishment of calls. BICC may functionally be compared with ISUP. BICC is originally developed by the ITU and is later adopted by 3GPP. One of the features of BICC is the "deferred Media Gateway selection". This feature will be explained with reference to FIG. 3. In FIG. 3, an originating MSC Server 301 is communicating with a next MSC Server referred to as TSC Server 302. The originating MSC Server 301 sends a BICC Initial Address Message (BICC IAM) to the TSC Server 302, see arrow 303. Next, the TSC Server 302 selects the optimal MGW, which is in this case a MGW 305. This MGW 305 is connected to a PSTN/ISDN network 306. The originating MSC Server 301 is further communicating with a MGW 307 which is connected to a RAN 308. Deferred MGW selection facilitates optimum MGW selection for a CS call. The originating MSC Server 301 defers the selection of MGW until the next MSC Server (i.e. TSC Server 302) has selected a MGW (i.e. MGW 305). In that manner, the originating MSC Server 301 may aim to select the same MGW 305 as the TSC Server 302. Hereto, the MSC Server 301 receives a BICC Application Transport Mechanism (APM) message from the TSC Server 302, see arrow 309. Next, the MSC Server 301 will select a MGW (i.e. the MGW 307) and will send a setup request to the MGW 307, see arrow 310. Message 310 forms part of the Media Gateway Control (Megaco) protocol, as defined by 3GPP. Finally, the MGW 307 initiates bearer establishment towards MGW 305, see arrow 311. In the ideal case, the MGW 307 selected by MSC Server 301 is the same MGW as MGW 305 selected by TSC Server 302.

According to an embodiment, a new type of "deferred MGW selection" is applied between a first WLAN AP and a second WLAN AP, for a mobile to mobile call. This enables the respective WLAN AP's (referred to as WLAN AP-A and WLAN AP-B) to indicate to one another that media may be relayed between them, without traversing through an MGW.

Figure 4:
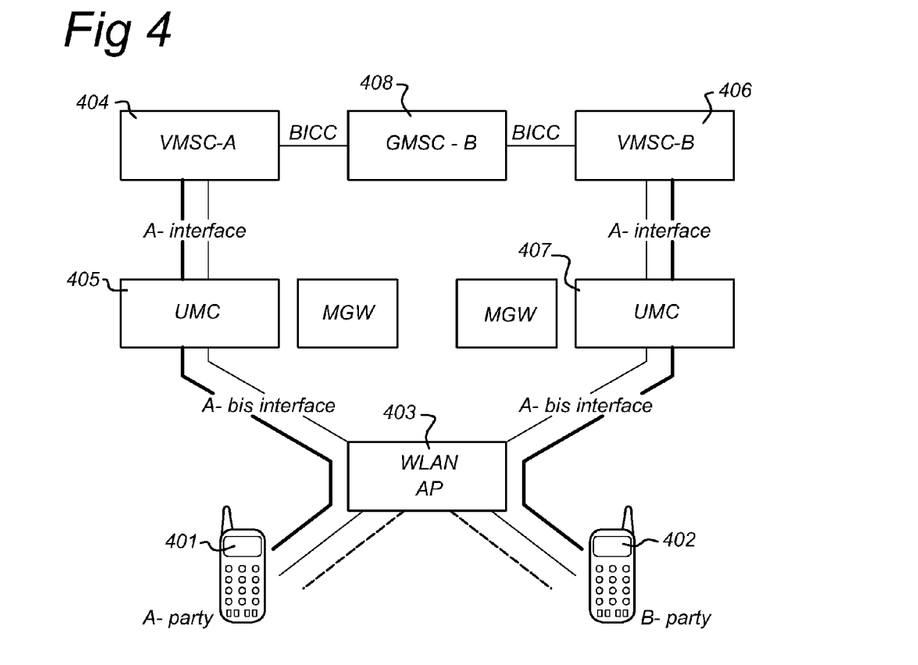
FIG. 4 shows part of a telecommunication network according to a first embodiment, in which two mobile terminals communicate WLAN related information to each other.

FIG. 4 shows an example of media transport between a MS-A 401 and a MS-B 402 according to an embodiment of the invention. In this example, a so-called WLAN AP-A functionality and a WLAN AP-B functionality are assumed to be implemented in one and the same WLAN AP 403. The MS-A 401 is connected to a Visited MSC 404 (referred to as VMSC-A) via the WLAN AP 403 and a UMC 405. The second Mobile Station 402 is connected to a Visited MSC 406 (referred to as VMSC-B) via the WLAN 403 and a UMC 407, see FIG. 4. Both the VMSC-A 404 and the VMSC-B 406 communicate with a Gateway MSC-B (GMSC-B) 408. A commitment between the WLAN AP-A and the WLAN AP-B to use WLAN for media transport, is accomplished by means of an enhancement to DTAP and an enhancement to BICC. When MS-A 401 establishes a call by sending a DTAP Setup message towards VMSC-A 404, this DTAP Setup message passes through the WLAN AP-A and the UMC 405. The WLAN AP-A augments the DTAP Setup message by inserting an indication into the DTAP Setup message, indicating that media transfer may take place directly from the WLAN AP-A. This indication is referred to as local media transfer (LMT) indication and may be a boolean value that is set to the value TRUE. The indication may also include an IP address and port number associated with WLAN AP-A. The IP address and the port number may be used by the WLAN AP-B for media transfer to and from the WLAN AP-A. The (enhanced) DTAP Setup message passes through UMC-A 405. Due to the presence of the LMT indication in the DTAP Setup message, the VMSC-A 404 does not allocate a MGW for the media transport to and from MS-A 401 (i.e. the VMSC-A 404 will defer the selection of a MGW), since it is aware that the media transport may be relayed directly between the WLAN APs, pending affirmative response from the remote WLAN AP. The VMSC-A 404 will place the LMT indication in a BICC IAM towards the GMSC-B 408 and the VMSC-B 406. The VMSC-B 406 places the LMT indication in a DTAP Setup message towards the MS-B 402. The VMSC-B 406 does not allocate a MGW for the media transport to and from the MS-B 402, since the media transport will be relayed directly between the WLAN APs. The DTAP Setup message sent from the VMSC-B 406 to the MS-B 402 passes through the UMC-B 407 and the WLAN AP-B. The WLAN AP-B removes the LMT indication from the DTAP Setup prior to forwarding the DTAP Setup to MS-B 402. The WLAN AP-B is now aware, by virtue of receiving the LMT indication in the DTAP Setup message, that the WLAN AP-A has offered local media transfer. In this embodiment, the MS-B 402 may be a state of the art mobile terminal and does not need adjustment. The MS-B 402 confirms receipt of the call establishment request by sending DTAP Call Confirmed message in backwards direction, i.e. towards the VMSC-B 406. The DTAP Call Confirmed message passes through the WLAN AP-B and the UMC-B 407. If the WLAN AP-B accepts the local media transfer from the WLAN AP-A, then WLAN AP-B augments the DTAP Call Confirmed message by inserting an acknowledge LMT indication into the DTAP Call Confirmed message, indicating that media transfer may take place directly between the WLAN AP-A and the WLAN AP-B, in the example of FIG. 4 jointly embodied in the WLAN AP 403. The acknowledge LMT indication may also include an IP address and port number associated with WLAN AP-B; the IP address and the port number may be used by the WLAN AP-A for media transfer to and from the WLAN AP-B. The VMSC-B 406 will, upon receipt of the augmented DTAP Call Confirmed message, send BICC Bearer Info message to the GMSC-B 408, which passes the BICC Bearer Info message on to the VMSC-A 404. The VMSC-B 406 includes the acknowledge LMT indication in this BICC Bearer Info message. The VMSC-A 404 sends a DTAP Call Confirmed message towards the WLAN AP-A. The VMSC-A 404 includes the acknowledge LMT indication in this DTAP Call Confirmed message. This DTAP Call Confirmed message passes through the UMC-A 405. The WLAN AP-A is now aware, by virtue of receiving said acknowledge LMT indication in the DTAP Call Confirmed message that the WLAN AP-B has accepted local media transfer.

Subsequent handling of an Alerting message and an Answer message will now take place as will be known to the skilled person. When the Answer message is sent from MS-B 402 to MS-A 401, the following media paths are established:

(1) MS-A 401 uses the WLAN connection with the WLAN AP-A for media transport to and from said WLAN AP-A;

(2) the WLAN AP-A uses the IP address and port number included in the acknowledge LMT indication received from WLAN AP-B, for media transport to and from the WLAN AP-B;

(3) WLAN AP-B uses the IP address and port number included in the LMT indication received from WLAN AP-A, for media transport to and from the WLAN AP-A;

(4) MS-B 402 uses the WLAN connection with WLAN AP-B for media transport to and from the WLAN AP-B.

The VMSC-A 404 may ascertain that the GMSC-B 408 does not belong to the same PLMN as VMSC-A 404 or that the MS-B 402 does not belong to the same PLMN as VMSC-A 404. In such cases, the VMSC-A 404 may decide not to include the LMT indication in the BICC IAM. The GMSC-B 408 may ascertain that the call originates from another PLMN than that of GMSC-B 408 or that the MS-A 401 does not belong to the same PLMN as GMSC-B 408. In such case, the GMSC-B 408 may decide to remove the LMT indication from the BICC IAM. The VMSC-B 406 may ascertain that the call originates from another PLMN than that of VMSC-B 406 or that MS-A 401 does not belong to the same PLMN as VMSC-B 406. In such case, the VMSC-B 406 may decide not to include the LMT indication in the DTAP Setup message. In the above-described cases, local media transport will not be offered to WLAN AP-B. Call establishment falls back to the methodology as defined in prior art, such as e.g. deferred MGW selection, whereby the media transport still runs through MGW.

If the WLAN AP-B 403 does not support local media transport, then it will not include the acknowledge LMT indication in the DTAP Call confirmed message. Alternatively, the WLAN AP-B 403 may support local media transport but may decide for any reason that it can not or will not accept the local media transport for this call, in which case it will not include the acknowledge LMT indication in the DTAP Call confirmed message. In such case, the backwards DTAP signalling and BICC signalling does not contain the acknowledge LMT indication. The call establishment reverts to MGW selection as defined for prior art, such as deferred MGW selection.

In a further embodiment of the present invention, the call establishment between the MS-A and the MS-B is subject to Intelligent Network (IN) service. The IN service may be invoked at one or more of the VMSC-A 404, the GMSC-B 408 and the VMSC-B 406. The LMT indication indicating that media may be relayed between the WLAN AP-A 403 and the WLAN AP-B 403, is transferred via the BICC signalling between the VMSC-A 404, the GMSC-B 408 and the VMSC-B 406. When the IN service has gained control over the call, the MSC from where the IN service is invoked, may report the LMT indication to the IN service. This facilitates the IN service to determine whether it permits the local media transfer. If the IN service decides that local media transfer is not permitted, then the IN service removes the LMT indication from the BICC signalling. Call establishment will then fall back to the regular deferred MGW selection.

Figure 5:
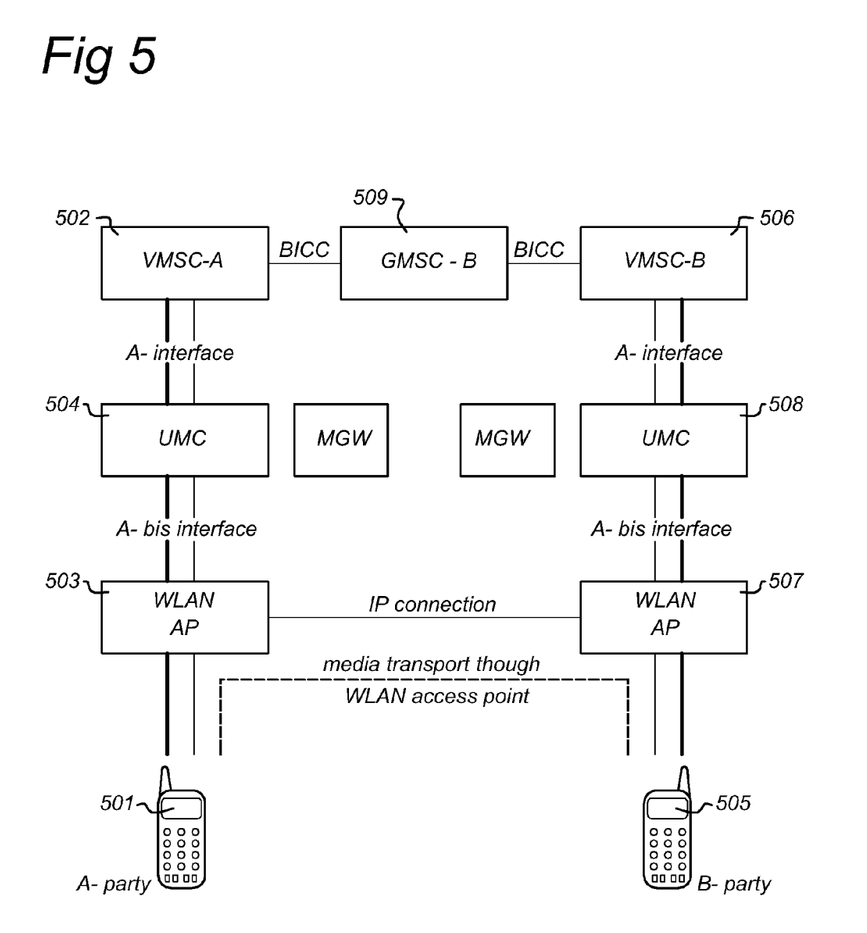
FIG. 5 shows part of a telecommunication network according to a second embodiment, in which two mobile terminals communicate WLAN related information to each other.

The WLAN relay for media may also be applied when the A-party and B-party are attached to different WLAN APs, see FIG. 5. In FIG. 5, a first mobile Station 501 signals a VMSC-A 502 via a WLAN AP 503, and a UMC 504. A second Mobile Station 505 signals a VMSC-B 506 via a WLAN AP 507 and a UMC 508. Both the VMSC-A 502 and the VMSC-B 506 are communicating with a GMSC-B 509. A PLMN operator may apply a policy that media may be transferred between two the WLAN APs 503, 507 in the case that the two WLAN APs 503, 507 belong to the same enterprise. Another policy may be that the WLAN APs 503, 507 must be connected to the same UMC. In FIG. 5, the call related signalling (DTAP) is transferred through RAN. The media is transferred through the two WLAN APs 503, 507, see dashed lines in FIG. 5.

Figure 6:
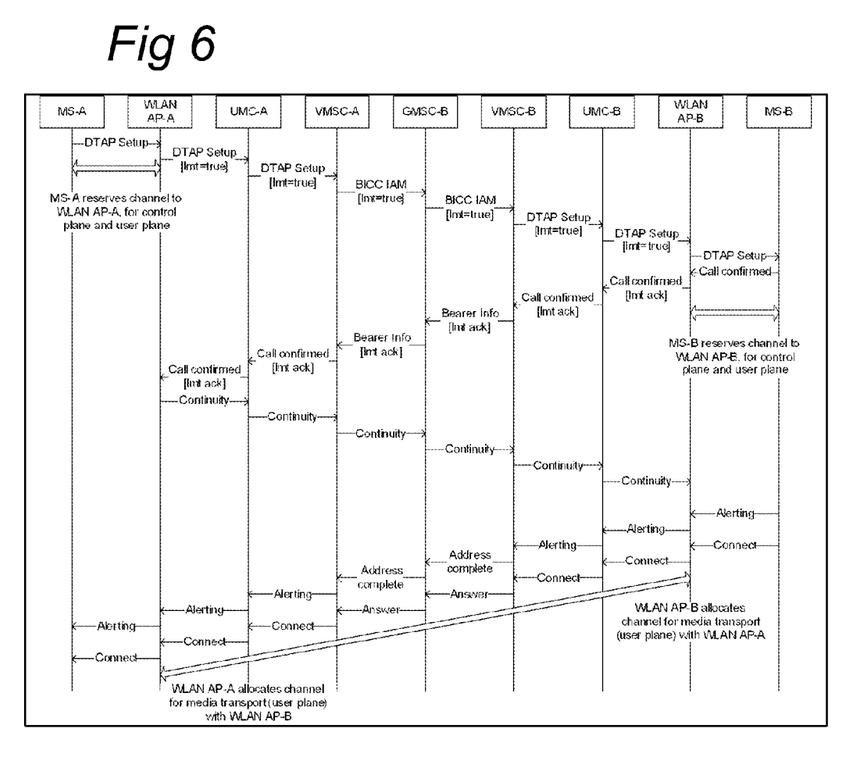
FIG. 6 shows an example of a signal sequence diagram for setting up a call according to an embodiment.

FIG. 6 shows an example of a signal sequence diagram for setting up a call according to an embodiment. As can be seen from FIG. 6, a LMT indication is forwarded by means of sending a BICC IAM message and a DTAP Setup message in the direction of the WLAN AP-B. If the WLAN AP-B has decided that it will use local media transfer, it will send an acknowledge LMT indication back to the WLAN AP-A. Once both the WLAN AP-A and the WLAN AP-B are committed to use local media transfer, a connection will be established by way of sending continuity messages, alerting messages and answer messages as can be seen in FIG. 6.

Figure 7:
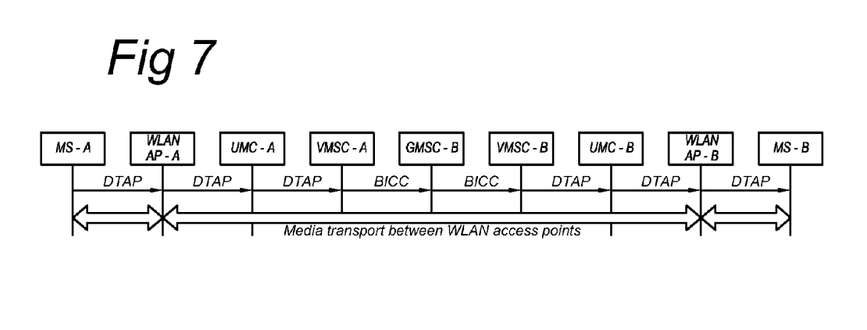
FIG. 7 shows an example of a signal sequence diagram together with the resulting media paths.

FIG. 7 shows an example of a signal sequence diagram together with the media paths resulting from the signalling indicated by FIG. 6.

Figure 8:
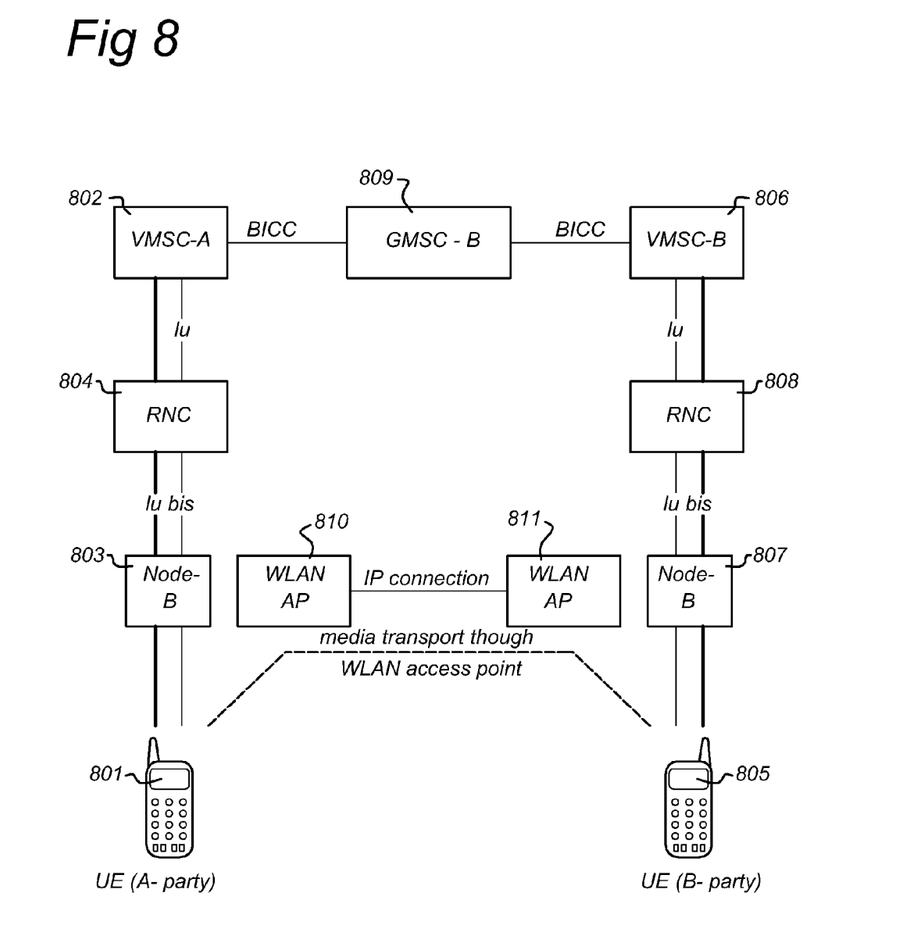
FIG. 8 shows part of a telecommunication network according to a third embodiment, in which two mobile terminals communicate WLAN related information to each other.

The present invention proposes so far that WLAN relay for media can be used in combination with UMA. WLAN relay for media may, however, also be used in combination with standard RAN/UTRAN, see FIG. 8. FIG. 8 reflects DTAP signalling between a first UMTS terminal called UE-A 801 (i.e. User Equipment of user A) and a MSC-A 802 and between a UMTS terminal called UE-B 805 and a VMSC-B 806, through standard UMTS UTRAN. The UE-A 801 and the UE-B 805 also have WLAN access, see WLAN APs 810, 811. FIG. 8 also shows a Node-B 803, and a Node-B 807 which form the APs between the User equipment 801, 805 and the radio network. FIG. 8 further shows two Radio network controllers (RNCs) 804, 808; one RNC may control one or more Node-B's. Similar to the method described with reference to FIGS. 4 and 5, the UE-A 801 and the UE-B 805 can exchange a LMT indication with one another. In an embodiment, the UE-A 801 establishes IP connectivity through the WLAN AP-A 810. The UE-A 801 receives from the WLAN AP-A 810 an IP address and a port number via which media may be transferred to the UE-A 801. When the UE-A establishes a call, it will include a LMT indication comprising the IP address and the port number into the DTAP Setup message. The LMT indication and thus the IP address and port number will be transferred to UE-B 805, facilitating the UE-B 805 to use the IP address and the port number for the transfer of media to the UE-A 801.

The UE-B 805 establishes IP connectivity through the WLAN AP-B 811. The UE-B 805 receives from the WLAN AP-B 811 an IP address and a port number via which media may be transferred to the UE-B 805. When the UE-B 805 accepts a call, it includes an acknowledge LMT indication comprising the IP address and the port number into the DTAP Call confirmed message. The acknowledge LMT indication and thus the IP address and port number will be transferred to the UE-A 801, facilitating the UE-A 801 to use the IP address and port number of the WLAN AP-B 811 for the transfer of media to the UE-B 805. The media component of the call, i.e. the user plane, may now be relayed through the respective WLAN APs 810, 811. According to this embodiment, call related signalling (DTAP) is transferred through UTRAN, see thick lines in FIG. 8, and the media is transferred through WLAN APs, see dashed lines in FIG. 8. If the WLAN infrastructure is e.g. an enterprise' own WLAN infrastructure, then this will lead to lower call charges. A further advantage of this embodiment is that the operator does not need to deploy UMA. Hence, the advantage of the media transfer through WLAN may be attained with less investment.

It should be noted that connecting the media stream locally in a WLAN AP or between two WLAN APs, requires that no interaction with the media stream is required. Examples where interaction may be required are the following:

Lawful intercept: first, calls that are established between users on the company premises should not be subject to lawful intercept. Nevertheless, if it is required that lawful intercept shall always be possible for these cases, then: (1) calls for which lawful intercept applies should not be connected locally at the WLAN AP or (2) when lawful intercept is required for a call, then e.g. the MSC Server 10 should instruct the WLAN AP to undo the drop back, i.e. the WLAN should be instructed to route the call through the MGW again or (3) the WLAN AP should get an instruction to duplicate the media streams from the A-party and the B-party and to send these media streams to the lawful intercept recording entity;

User interaction: announcements may need to be played during a call. In that case, the MSC Server 10 could give an instruction to the WLAN AP to temporarily connect the call through the CS-MGW 19.

The present invention has been explained above with reference to a number of exemplary embodiments. As will be apparent to the person skilled in the art, various modifications and amendments can be made without departing from the scope of the present invention, as defined in the appended claims.

LIST OF ABBREVIATIONS

ACM Address Complete Message
BICC Bearer Independent Call Control
CAMEL Customised Applications for Mobile network Enhanced Logic
CAP CAMEL Application Part
CS Circuit Switched
GMSC Gateway Mobile services Switching Centre
GSM Global System for Mobile communication
IAM Initial Address message
IN Intelligent Networks
INAP IN Application Part
ISDN Integrated Services Digital Network
ISUP ISDN User Part
LAN Local Area Network
MS Mobile Station
MSC Mobile services Switching Centre
SCP Service Control Point
SIP Session Initiation Protocol
SSF Service Switching Function
UE User Equipment
UMA Unlicensed Mobile Access
UMC Unlicensed Mobile access Controller
WLAN Wireless LAN

The invention claimed is:

1. Method of operating a telecommunication network for setting up a call between a first and a second Wireless Local Area Network (WLAN)-enabled mobile terminal, said telecommunication network comprising a first switching node, a second switching node, a gateway switching node, a first WLAN Access Point (AP) serving said first WLAN-enabled mobile terminal and a second WLAN AP serving said second WLAN-enabled mobile terminal, wherein:

said first WLAN AP inserts a local media transfer (LMT) indication into a Direct Transfer Application Part (DTAP) Setup message, indicating that media transfer may take place directly from the first WLAN AP;

said first switching node receives said first DTAP Setup message from said first WLAN AP;

said first switching node includes said LMT indication into a call establishment message, and sends said call establishment message to said gateway switching node;

said gateway switching node receives said call establishment message from said first switching node and sends said call establishment message to said second switching node;

said second switching node receives said call establishment message from said gateway switching node;

said second switching node includes said LMT indication into a second DTAP Setup message, and sends said second DTAP Setup message to said second WLAN AP;

said second WLAN AP receives said second DTAP Setup message, wherein said second WLAN AP inserts an acknowledge LMT indication in a first call confirm message if said second WLAN AP agrees to use local media transfer;

said second WLAN AP sends said first call confirm message to said second switching node;

said second switching node receives said first call confirm message from said second WLAN AP;

said second switching node includes said acknowledge LMT indication into an info message, and sends said info message to said gateway switching node;

said gateway switching node receives said info message from said second switching node and sends said info message to said first switching node;

said first switching node receives said info message from said gateway switching node;

said first switching node inserts said acknowledge LMT indication into a second call confirm message, and sends said second call confirm message to said first WLAN AP;

said first WLAN AP uses information included in said acknowledge LMT indication received from said second WLAN AP, for media transport to and from said second WLAN AP; and, said second WLAN AP uses information included in said LMT indication received from said first WLAN AP, for media transport to and from said first WLAN AP.

2. The method according to claim 1, wherein said LMT indication comprises at least one of:
a boolean value indicating that local media transfer is offered by said first WLAN AP for the call;
an IP address associated with said first WLAN AP; and
a port number associated with said first WLAN AP.

3. The method according to claim 1, wherein said acknowledge LMT indication comprises at least one of:
a boolean value indicating that local media transfer is accepted by said second WLAN AP for the call;
an IP address associated with said second WLAN AP; and,
a port number associated with said second WLAN AP.

4. The method according to claim 1, wherein said first switching node includes said LMT indication into said call establishment message only if said gateway switching node belongs to a same Public Land Mobile Network (PLMN) as the first switching node.

5. The method according to claim 1, wherein said second switching node includes said LMT indication into said second DTAP Setup message only if said gateway switching node belongs to a same Public Land Mobile Network (PLMN) as said second switching node.

6. The method according to claim 1, wherein said telecommunication network further comprises a service control entity, and wherein:
an invoking node invokes an Intelligent Network (IN) service running on said service control entity by sending a trigger message comprising said LMT indication;
the IN service indicating to said invoking node whether media related to said call may be transferred directly between said first WLAN AP and said second WLAN AP; and,
the IN service receiving from said invoking node an indication whether local media transfer will take place between said first WLAN AP and said second WLAN AP.

7. The method according to claim 6, wherein said invoking node is said first switching node, said second switching node or said gateway switching node.

8. The method according to claim 1, wherein said call establishment message is sent using a Bearer Independent Call Control (BICC) protocol or Session Initiation Protocol (SIP).

9. The method according to claim 1, wherein said telecommunication network is a Global System for Mobile Communications (GSM) or a Universal Mobile Telecommunications Network (UMTS).

* * * * *

UNITED STATES PATENT AND TRADEMARK OFFICE
CERTIFICATE OF CORRECTION

PATENT NO. : 8,284,745 B2  Page 1 of 1
APPLICATION NO. : 12/675898
DATED : October 9, 2012
INVENTOR(S) : Noldus It is certified that error appears in the above-identified patent and that said Letters Patent is hereby corrected as shown below:

In the Drawings

In Fig. 1, Sheet 1 of 5, delete "Fig" and insert -- Fig. --, therefor at each occurrence throughout the Drawings.

In the Specifications

In Column 4, Line 60, delete "Art" and insert -- art --, therefor.

In Column 10, Line 34, delete "message" and insert -- Message --, therefor.

In Column 10, Line 41, delete "services".

In the Claims

In Column 11, Line 42, in Claim 2, delete "AP; and" and insert -- AP; and, --, therefor.

In Column 12, Lines 40-41, in Claim 9, delete "Telecommunications Network (UMTS)." and insert -- Telecommunications System (UMTS) network. --, therefor.

Signed and Sealed this
Sixteenth Day of April, 2013

Teresa Stanek Rea
*Acting Director of the United States Patent and Trademark Office*